(12) United States Patent
Cutler

(10) Patent No.: US 8,531,310 B2
(45) Date of Patent: Sep. 10, 2013

(54) ELECTRIC FUNCTION MODULE ASSEMBLY

(76) Inventor: Paul Cutler, Charleston, SC (US)

( * ) Notice: Subject to any disclaimer, the term of this patent is extended or adjusted under 35 U.S.C. 154(b) by 803 days.

(21) Appl. No.: 12/661,804

(22) Filed: Mar. 24, 2010

(65) Prior Publication Data

US 2011/0234420 A1    Sep. 29, 2011

(51) Int. Cl.
G08B 5/22    (2006.01)

(52) U.S. Cl.
USPC ...... 340/815.45; 200/293; 200/297; 200/308; 200/312; 439/535

(58) Field of Classification Search
USPC ............... 340/541; 220/241, 242; 439/535, 439/188, 954, 221; 200/302.3, 402, 331, 200/329, 51.09, 293, 297, 502, 308, 312, 200/315, 333; 174/66, 67, 53; 361/797; 714/14
See application file for complete search history.

(56) References Cited

U.S. PATENT DOCUMENTS

| | | | |
|---|---|---|---|
| 4,117,258 A | 9/1978 | Shanker | |
| 4,669,804 A | 6/1987 | Munroe | |
| 4,947,281 A * | 8/1990 | Boteler | 361/56 |
| 5,413,501 A * | 5/1995 | Munn | 439/535 |
| 5,934,935 A | 8/1999 | Kameyama | |
| 5,967,815 A | 10/1999 | Schlessinger et al. | |
| 6,492,907 B1 * | 12/2002 | McCracken | 340/628 |
| 6,534,734 B2 | 3/2003 | Davis | |
| 7,009,111 B1 | 3/2006 | Rintz | |
| 7,122,753 B1 | 10/2006 | Davis | |
| 7,232,336 B1 | 6/2007 | Evans | |
| 7,273,983 B1 * | 9/2007 | Rintz | 174/66 |
| 8,248,058 B2 * | 8/2012 | Stair et al. | 324/133 |
| 2004/0238341 A1 | 12/2004 | Yu et al. | |
| 2012/0008307 A1 * | 1/2012 | Delany | 362/95 |
| 2012/0262006 A1 * | 10/2012 | Elberbaum | 307/112 |

* cited by examiner

*Primary Examiner* — Brent Swarthout

(74) *Attorney, Agent, or Firm* — P. Jeff Martin; The Law Firm of P. Jeffrey Martin, LLC

(57) ABSTRACT

An electric function module assembly is disclosed. The assembly includes an electric switch box having a pair of electrical contacts adapted for slidable connective engagement with a respective pair of electrical contacts of a switch cover. The contacts of the switch cover are electrically connected to a function indicator to operate the function indicator.

17 Claims, 7 Drawing Sheets

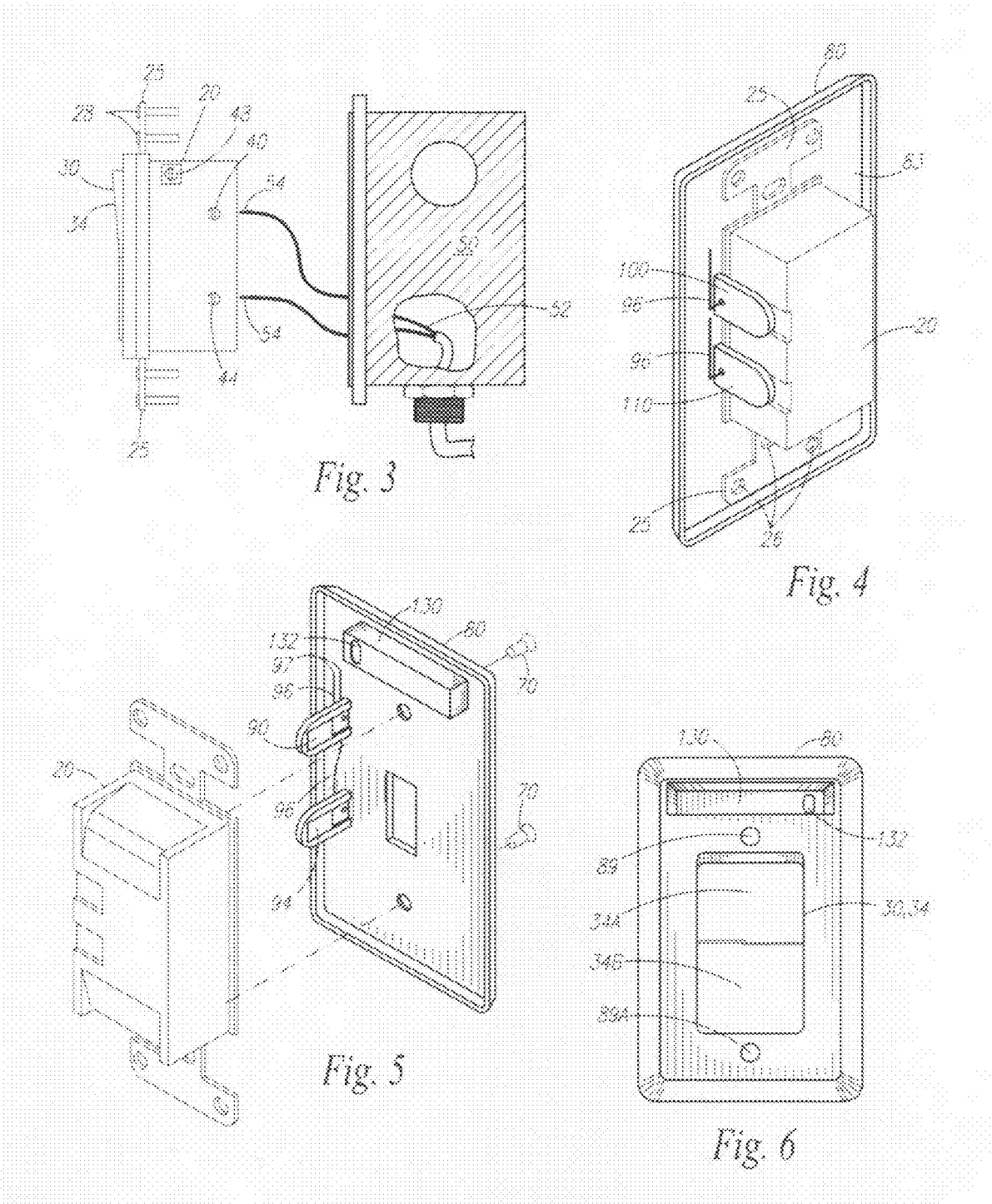

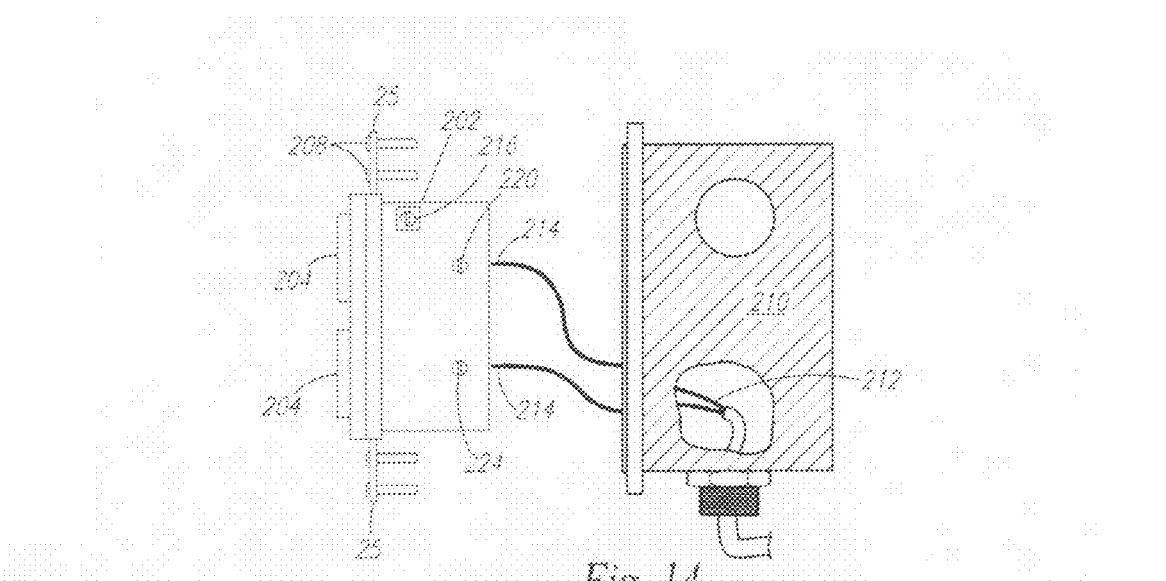
Fig. 14
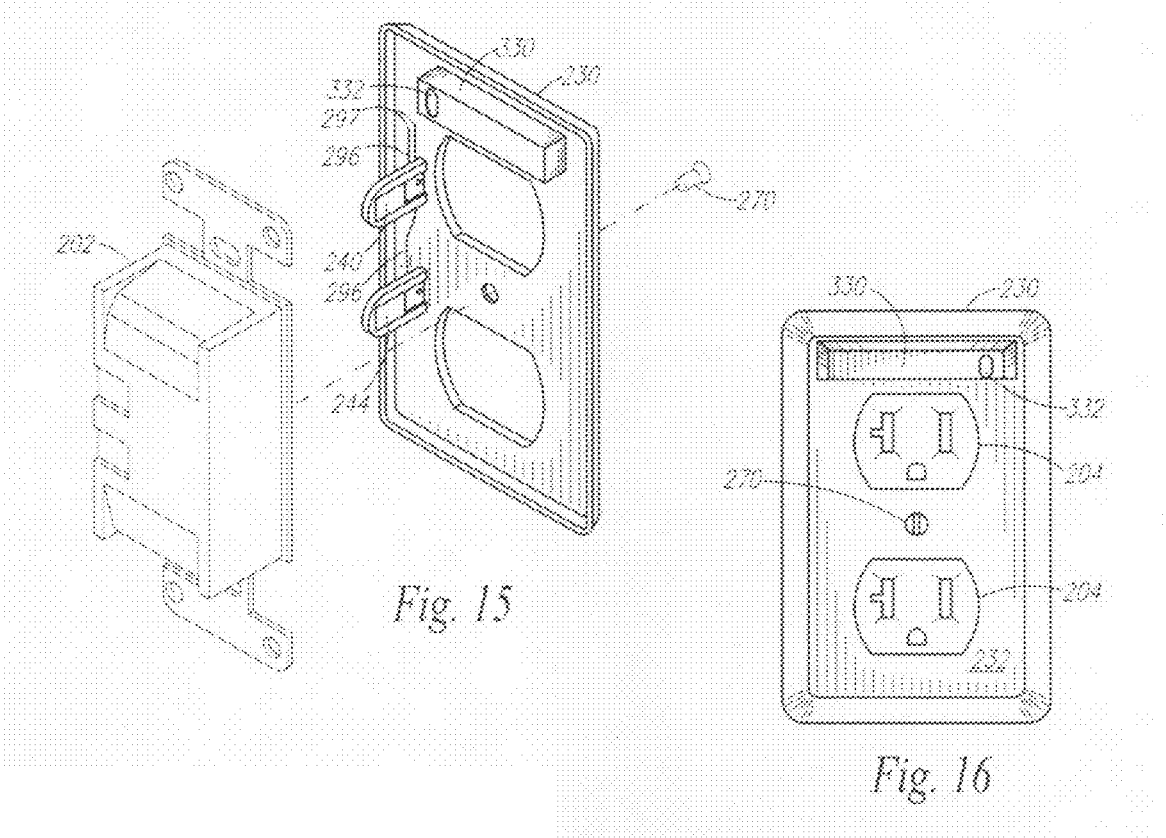
Fig. 15
Fig. 16

ELECTRIC FUNCTION MODULE ASSEMBLY

RELATED APPLICATIONS

There are no previously filed, nor currently any co-pending applications, anywhere in the world.

BACKGROUND OF THE INVENTION

1. Field of the Invention

This application discloses and claims embodiments related generally to electrical switches, and more particularly, to an electric function module assembly.

2. Description of the Related Art

The prior art teaches numerous wall plate switch assemblies, electrical connection boxes for electrical modules, and light switch covers or plates for mounting over existing wall switches. However, the prior art does not disclose an electric switch box comprising a pair of electrical contacts adapted for slidable connective engagement with a respective pair of electrical contacts of a switch cover.

Accordingly, a need has arisen for an electric function module assembly comprising an electric switch box having a pair of electrical contacts adapted for slidable connective engagement with a respective pair of electrical contacts of a switch cover, the contacts of switch cover being electrically connected to a function indicator to operate the function indicator. The development of the electric function module assembly fulfills this need.

A search of the prior art did not disclose any patents that read directly on the claims of the instant invention; however, the following references were considered related.

U.S. Pat. No. 6,534,734 B2, issued in the name of Davis;
U.S. Pat. No. 7,232,336 B1, issued in the name of Evans;
U.S. Pat. No. 5,934,935, issued in the name of Kameyama;
U.S. Pat. No. 4,669,804, issued in the name of Munroe;
U.S. Patent Application no. 2004/0238341 A1, published in the name of Yu et al.;
U.S. Pat. No. 4,117,258, issued in the name of Shanker,
U.S. Pat. No. 7,122,753 B1, issued in the name of Davis;
U.S. Pat. No. 7,009,111 B1, issued in the name of Rintz; and
U.S. Pat. No. 5,967,815, issued in the name of Schlessinger et al.

Consequently, a need has been felt for an electric function module assembly. This application presents claims and embodiments that fulfill a need or needs not yet satisfied by the products, inventions and methods previously or presently available. In particular, the claims and embodiments disclosed herein describe an electric function module assembly, electric function module assembly is permanently affixed to a standard electrical junction box providing electric power wiring, the electric function module assembly comprising an electric switch box and a switch cover being attachable thereto, the electric switch box having a pair of electrical contacts adapted for slidable connective engagement with a respective pair of electrical contacts of the switch cover, the contacts of switch cover being electrically connected to a function indicator to operate the function indicator, the electric function module assembly providing unanticipated and nonobvious combination of features distinguished from the products, inventions and methods preexisting in the art. The applicant is unaware of any product, method, disclosure or reference that discloses the features of the claims and embodiments disclosed herein.

SUMMARY OF THE INVENTION

In accordance with one embodiment of the present invention, an electric function module assembly is disclosed. The electric function module assembly comprises an electric switch box having a mechanical movement means for actuation of the electric switch box. The electric function module assembly is permanently affixed to a standard electrical junction box providing electric power wiring for electrical connection therewith.

The electric switch box comprises a pair of electrical contacts having an electrical load wired in series therewith. The electric switch box includes a third electrical contact to which a ground wire is connected.

A switch cover is provided for attachment to the electric switch box. The switch cover comprises a pair of electrical contacts adapted for slidable connective engagement with the respective pair of electrical contacts of electric switch box. The switch cover includes an opening defined therethrough to allow the mechanical movement means of electric switch box to pass therethrough.

The switch cover further comprises a first and second ear integrally protruding perpendicularly from the bottom surface thereof switch. Each ear is provided with a recessed cavity within which the pair of electrical contacts respectively, are suitably affixed. The electrical contacts of the electric switch box are spatially arranged so as to intimately engage the electrical contacts of switch cover, respectively, when mounting the switch cover to electric switch box. The engagement by the electrical contacts of electric switch box with respective electrical contacts of switch cover form a frictional, interference fit, thereby ensuring hot electrical connection therebetween.

The electrical contacts of switch cover have electrical wires running therefrom, the electrical wires having ends electrically connected to a function indicator. Thus, as the electrical contacts of electric switch box mate with the electrical contacts of switch cover, respectively, electrical power travels through the electrical wires to function indicator to operate function indicator. The function indicator is suitably affixed within a recessed cavity formed within an upper portion of the switch cover. The function indicator function indicator may comprise a light-emitting diode (LED) nightlight, a liquid crystal display (LCD) temperature gauge, or a peak demand status indicator.

An alternate embodiment of the present invention is disclosed, wherein electric function module assembly comprises an electrical outlet assembly. The electric outlet assembly comprises an electrically nonconductive housing which supports dual female receptacles. The nonconductive housing is provided with outer flanges at a top and bottom end thereof. The flanges are each provided with a plurality of apertures for receipt of mounting screws which attach housing to a standard electrical junction box providing electric power wiring. The electrical power wiring has exposed ends connected to the dual female receptacles by conventional means, the dual female receptacles having an electrical load wired in series therewith. The housing includes an electrical ground contact to which a ground wire is connected.

The nonconductive housing further comprises a pair of male electrical contacts, the male electrical contacts having an electrical load wired in series therewith.

A dual outlet cover is provided for attachment to the nonconductive housing. The dual outlet cover comprises a pair of female electrical contacts adapted for slidable connective engagement with the respective pair of male electrical contacts of nonconductive housing. The dual outlet cover includes pair of openings to allow passage by the dual female receptacles therethrough.

The dual outlet cover further comprises a first and second ear integrally protruding perpendicularly from the bottom surface of the dual outlet cover. Each ear is provided with a recessed cavity within which the female electrical contacts, respectively, of dual outlet cover are suitably affixed. The male electrical contacts of the nonconductive housing are spatially arranged so as to intimately engage the female electrical contacts, respectively, of cover when mounting the dual outlet cover to nonconductive housing. The engagement by male electrical contacts with respective female electrical contacts form a frictional, interference fit, thereby ensuring hot electrical connection therebetween.

The female electrical contacts of dual outlet cover have electrical wires running therefrom, the electrical wires having ends electrically connected to a function indicator. Thus, as the male electrical contacts of nonconductive housing mate with the female electrical contacts of dual outlet cover, respectively, electrical power travels through the electrical wires to function indicator to operate function indicator. The function indicator is suitably affixed within a recessed cavity formed within an upper portion of the dual outlet cover. The function indicator function indicator may comprise an LED nightlight, an LCD temperature gauge, or a peak demand status indicator.

The use of the present invention allows consumers to exercise and enjoy optimum energy and monetary conservation.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 3 is a side exploded view of an electric switch box of the electric function module assembly, in accordance with a second embodiment of the present invention;

FIG. 4 illustrates a rear perspective view of the electric function module assembly shown assembled, in accordance with the present invention;

FIG. 5 is an exploded rear perspective view of the electric function module illustrating a recessed cavity formed in the switch cover, according to the present invention;

FIG. 6 is a top plan view of the switch cover illustrating the recessed cavity, in accordance with another embodiment of the present invention;

FIG. 14 is a side exploded view of an electric switch box of the electric function module assembly, in accordance with the third embodiment of the present invention;

FIG. 15 is an exploded rear perspective view of the electric function module illustrating a recessed cavity formed in the receptacle cover, according to the present invention;

FIG. 16 is a top plan view of the receptacle cover mounted atop the electrically nonconductive housing, the cover illustrating the recessed cavity, in accordance with the present invention;

DESCRIPTION OF THE PREFERRED EMBODIMENT

Detailed Description of the Figures

Figure 1:
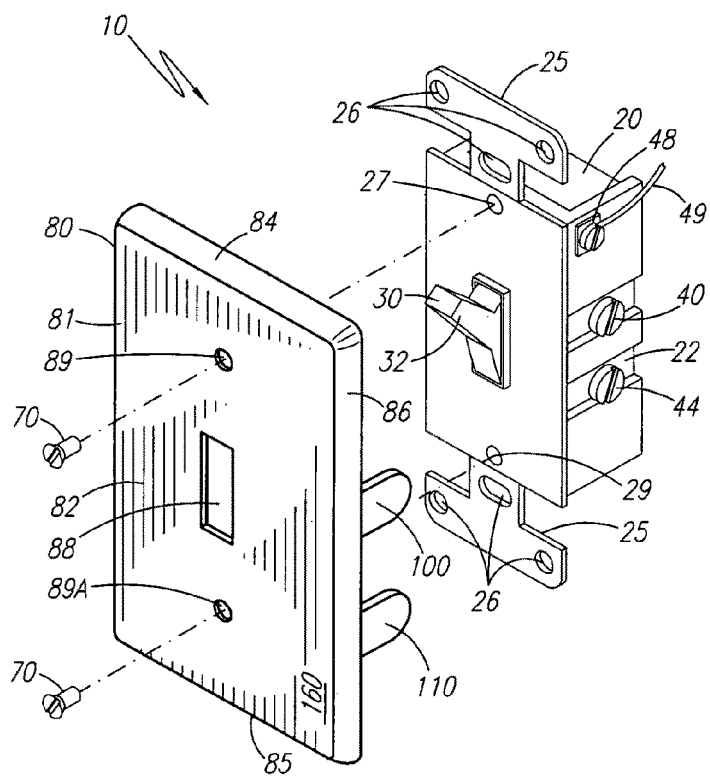
FIG. 1 illustrates an exploded view of a first embodiment for the electric function module assembly, in accordance with the present invention.
Figure 2:
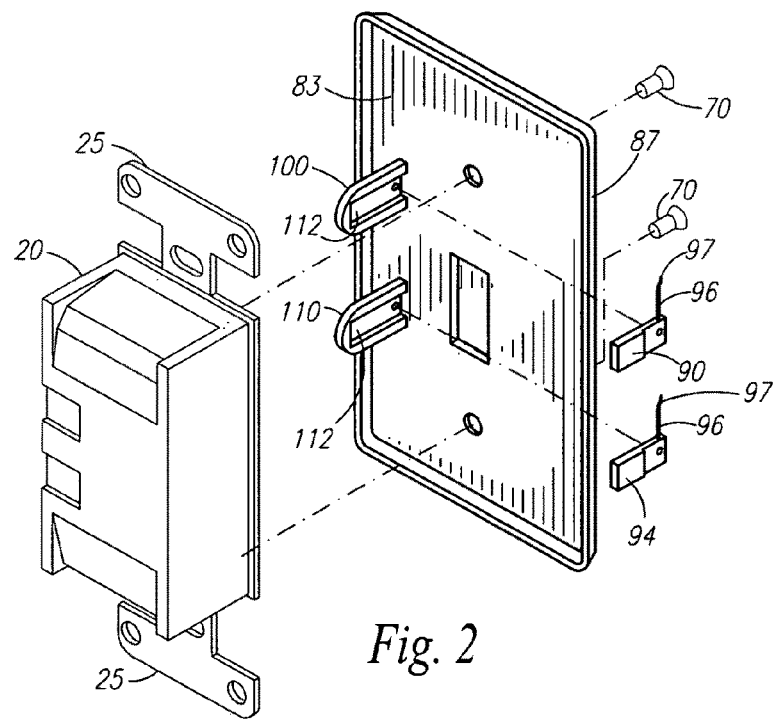
FIG. 2 is an exploded rear perspective view of the assembly illustrated in FIG. 1.

With reference to FIGS. 1-4, an electric function module assembly 10 is disclosed, according to one embodiment of the present invention. The electric function module assembly, hereinafter "assembly 10", comprises an electric switch box 20 having a mechanical movement means 30 for actuation of the electric switch box 20. The mechanical movement means 30 may be a toggle bat 32 or a rocker arm 34 for actuating the electric switch box 20. The assembly 10 may be permanently affixed to a standard electrical junction box 50 providing electric power wiring 52. The electrical power wiring 52 has exposed ends 54 attached to the electric switch box 20 by conventional means.

The electric switch box 20 comprises a first electrical contact 40 and a second electrical contact 44, the electrical contacts 40 and 44 having an electrical load wired in series therewith. The electric switch box 20 includes a third electrical contact 48 to which a ground wire 49 is connected. The electrical load is turned on by an upward vertical movement of toggle bat 32, and turned off by a downward vertical movement of toggle bat 32. Alternatively, for an embodiment comprising a rocker arm 34, the electrical load is turned on by pressing an upper portion 34a of rocker arm 34, and turned off by pressing a lower portion 34b of rocker arm 34.

The electric switch box 20 is provided with outer flanges 25 preferably at a top and bottom end of the electric switch box 20. The flanges 25 are each provided with a plurality of apertures 26 for receipt of mounting screws 28 which attach electric switch box 20 to electrical junction box 50. The electric switch box 20 is further provided with an upper switch cover attachment aperture 27 and a lower switch cover attachment aperture 29, the upper switch cover attachment aperture 27 is disposed below the top outer flange 25 of electric switch box 20, and the lower switch cover attachment aperture 29 disposed above the bottom outer flange 25 of electric switch box 20.

The first electrical contact 40 and second electrical contact 44 are male electrical contacts 40, 44 which protrude from a side wall 22 of the electric switch box 20. The male electrical contacts 40, 44 are adapted for slidable, connective engagement with respective female contacts 90, 94 of a switch cover 80 (to be described later in greater detail).

The switch cover 80 comprises a plate body 81 having a front surface 82 opposing a bottom surface 83, an upper sidewall 84, a lower sidewall 85, a left sidewall 86, a right sidewall 87. The switch cover 80 includes a pair of apertures 89, 89a defined therethrough and positioned to align with upper switch cover attachment aperture 27 and lower switch cover attachment aperture 29 of electric switch box 20, to allow a respective mounting screw 70 to be inserted through apertures 89, 89a and apertures 27, 29, respectively, for attaching switch cover 80 to electric switch box 20 when assembling the electric, function module assembly 10. An opening 88 is provided through the switch cover 80 to allow the toggle bat 32 or the rocker arm 34 to pass therethrough.

The front surface 82 of the switch cover 80 may be provided with any type of ornamentation or indicia 160, such as a company or corporate name, logo, wording, picture, photograph, or any other decorative, informational, promotional or advertisement indicia.

Switch cover 80 can be constructed of a resilient plastic, plastic polymer, thermoplastic, castable plastic or plastic capable of injection molding, blow molding, extrusion, and the like.

The switch cover 80 further comprises a first and second ear 100, 110 integrally protruding perpendicularly from the bottom surface 83 of switch cover 80. Each ear 100, 110 is provided with a recessed cavity 112 within which the female electrical contacts 90, 94, respectively, are suitably affixed. The male electrical contacts 40, 44 of the electric switch box 20 are spatially arranged so as to intimately engage the female electrical contacts 90, 94, respectively, when mounting the switch cover 80 to electric switch box 20. The engagement by male electrical contacts 40, 44 with respective female electrical contacts 90, 94 form a frictional, interference fit, thereby ensuring fixed, hot electrical connection between male electrical contacts 40, 44 and respective female electrical contacts 90, 94. The ears 100, 110 are sufficiently resilient to flexibly engage the corresponding male electrical contacts 40, 44, respectively when the ears 100, 110 are forced slightly aside by forcibly engaging slidably the male electrical contacts 40, 44 with the female electrical contacts 90, 94, respectively.

The female electrical contacts 90, 94 have electrical wires 96 running therefrom, the electrical wires 96 having ends 97 electrically connected to a function indicator 120 which provides specific functional actions. Thus, as the male electrical contacts 40, 44 mate with the female electrical contacts 90, 94, respectively, electrical power travels through electrical wires 96 to function indicator 120 to operate function indicator 120. The function indicator 120 is suitably affixed within a recessed compartment 130 formed within an upper portion of the switch cover 80. A hole 132 is provided in the recessed compartment 130 to allow connection by ends of electrical wires 96 to the function indicator 120.

Figure 7:
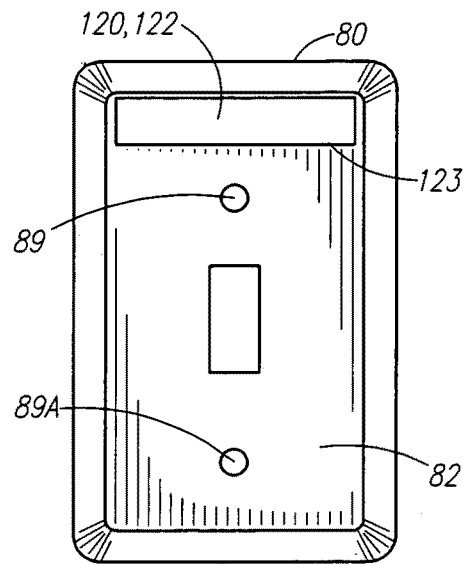
FIG. 7 is a top plan view of the switch cover incorporating a function indicator, in accordance with the present invention.

Referring now to FIGS. 5-9, and more specifically to FIGS. 5-7, the function indicator 120 may comprise an LED nightlight 122, an LCD temperature gauge 125, or a peak demand status indicator 128. An LED nightlight 122 is illustrated in FIG. 7, wherein the LED nightlight 122 is suitably affixed within the recessed compartment 130 formed within the upper portion of the switch cover 80, preferably above the upper aperture 89 of switch cover 80. The recessed compartment 130 is sizably shaped and configured to snugly receive the LED nightlight 122. The LED nightlight 122 is enclosed by a protective, transparent cover 123. Once mounted within the recessed compartment 130, the upper surface of the protective, transparent cover 123 is aligned contiguously with the front surface 82 of switch cover 80. Hole 132 in recessed compartment 130 allows connection by ends of electrical wires 96 to LED nightlight 122.

Figure 8:
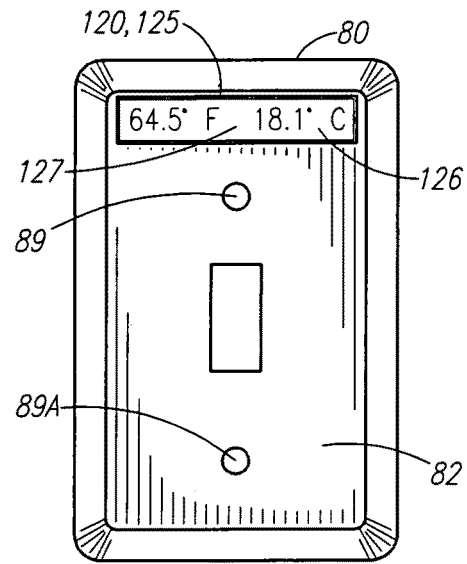
FIG. 8 is a top plan view of the switch cover incorporating a first alternative function indicator, in accordance with the present invention.
Figure 9:
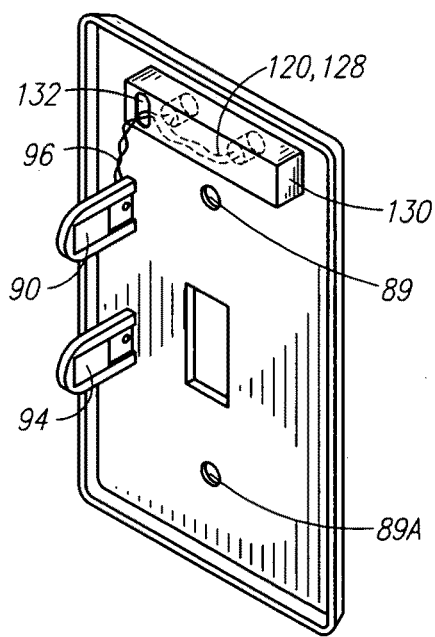
FIG. 9 is a rear perspective view of the switch cover incorporating a second alternative function indicator, in accordance with the present invention.
Figure 10:
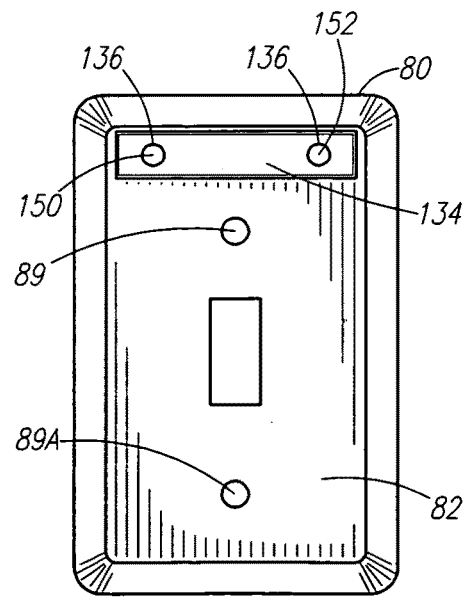
FIG. 10 is a top plan view of FIG. 9 illustrating the second alternative function indicator, in accordance with the present invention.
Figure 11:
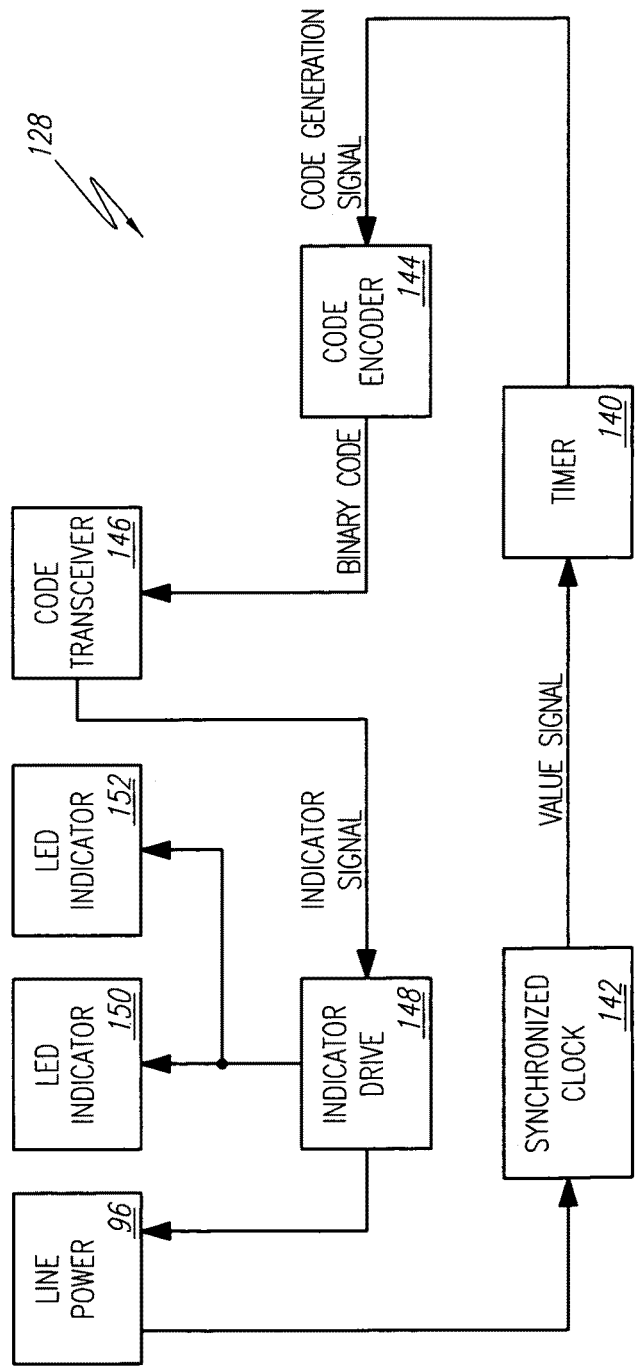
FIG. 11 is a detailed block diagram of a timer/transmitter circuit, according to one embodiment of the present invention.

Referring now more specifically to FIGS. 5-6, and 8, an LCD temperature gauge 125 is shown suitably affixed within the recessed compartment 130 of switch cover 80, preferably above the upper aperture 89 of switch cover 80. The recessed compartment 130 is sizably shaped and configured to snugly receive the LCD temperature gauge 125. The LCD temperature gauge 125 is enclosed by a protective, transparent cover 126. Once mounted within the recessed compartment 130, the upper surface of the protective, transparent cover 126 is aligned contiguously with the front surface 82 of switch cover 80. Hole 132 in recessed compartment 130 allows connection by ends of electrical wires 96 to LCD temperature gauge 125. Temperature is numerically displayed in both degrees Fahrenheit F. and degrees Celsius C. The LCD temperature gauge 125 has an accuracy of approximately +/−0.1 degrees F. or C. The LCD temperature gauge 125 may comprise a colored LED backlighting 127, such as red or green.

Referring now to FIGS. 5-6, and 9-11, a peak demand status indicator 128 is disclosed for indicating either a peak energy consumption time or a non-peak energy consumption time. The peak demand status indicator 128 is suitably disposed within the recessed compartment 130 of the switch cover 80. A door 134 is provided to enclose the indicator 128 within the recessed compartment 130. The door 134 is removably mounted to the front surface 82 of switch cover 80 via a snap fit connection. The door 134 is provided with a pair of LED receiving holes 136 through which a pair of LEDs 150, 152 are positioned.

The peak demand status indicator 128 comprises a timer 140 in communication with a synchronized clock 142, the clock 142 is synchronized with the current official time, the synchronized clock 142 is connected to ends of electrical wires 96, the timer 140 activates a code generation signal when timer 140 receives an energy consumption time value signal transmitted from the clock 142, the code generation signal is received and read by a code encoder 144. The code encoder 144 creates one of two serial binary codes indicating either a peak energy consumption time or a non-peak energy consumption time, the binary code is transmitted to a code transceiver 146 which then transmits an indicator signal town LED indicator drive 148 which enables one of two LED indicators 150, 152 to illuminate. Indicator 150 is illuminated when energy consumption is at a peak level, and indicator 152 is illuminated when energy consumption is at a non-peak level. Indicator 150 is a red LED which indicates a time during which energy consumption is at a peak level, and indicator 152 is a green LED which indicates a time during which energy consumption is at a non-peak level. The peak demand status indicator 128 provides an important functional notification feature to consumers, in that electrical energy charges are not only based on the total energy consumption, but are also based on peaks of that consumption within a given time frame, e.g., one hour to two hour intervals. Thus, the peak demand status indicator 128 allows a consumer to exercise and enjoy optimum energy and monetary conservation.

Figure 12:
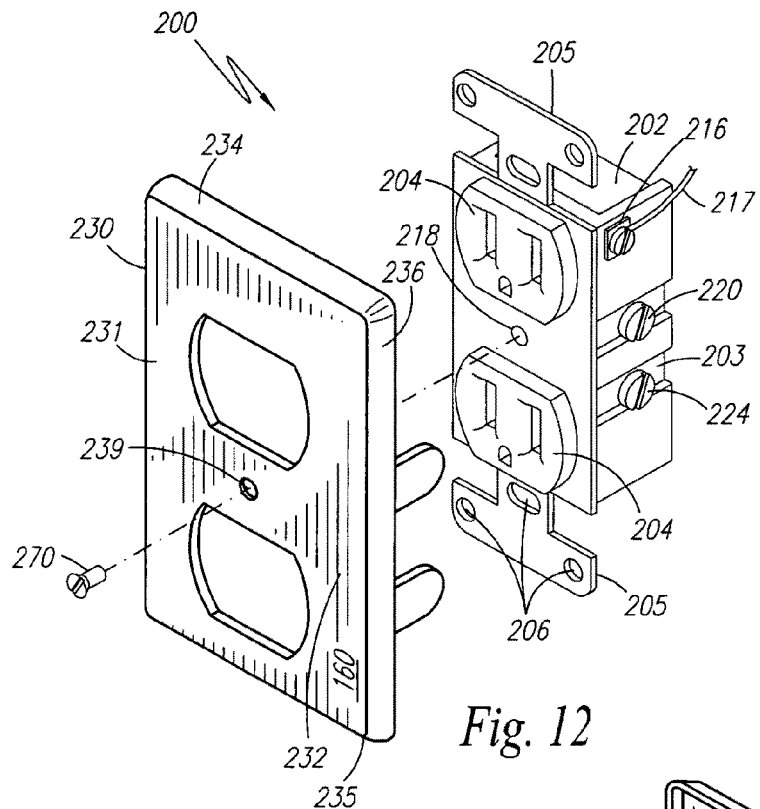
FIG. 12; illustrates an exploded view of a third embodiment for the electric function module assembly, in accordance with the present invention
Figure 13:
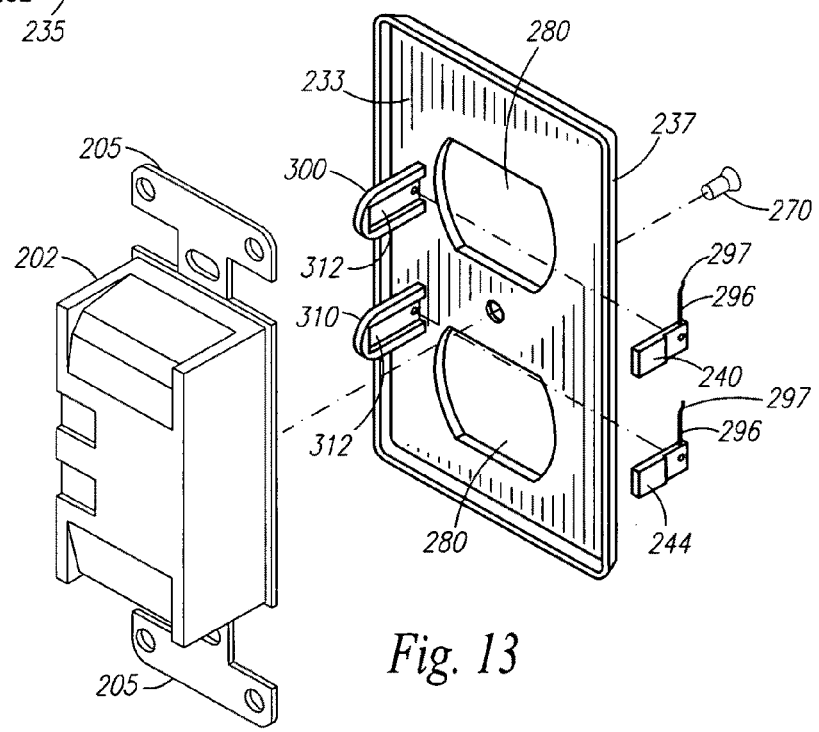
FIG. 13 is an exploded rear perspective view of the assembly illustrated in FIG. 12.

Referring now to FIGS. 12-14, an alternate embodiment of the present invention is disclosed, wherein electric function module assembly 10 comprises an electrical outlet assembly 200. The electric outlet assembly 200 comprises an electrically nonconductive housing 202 which supports dual female receptacles 204. The nonconductive housing 202 is provided with outer flanges 205 preferably at a top and bottom end thereof. The flanges 205 are, each provided with a plurality of apertures 206 for receipt of mounting screws 208 which attach housing 202 to a standard electrical junction box 210 providing electric power wiring 212. The electrical power wiring 212 has exposed ends 214 connected to the dual female receptacles 204 by conventional means, the dual female receptacles 204 having an electrical load wired in series therewith. The housing 202 includes an electrical ground contact 216 to which a ground wire 217 is connected. The nonconductive housing 202 is further provided with a dual outlet cover attachment aperture 218 disposed between the dual female receptacles 204.

The nonconductive housing 202 further comprises a first electrical contact 220 and second electrical contact 224, the electrical contacts 220 and 224 having an electrical load wired in series therewith. The first and second electrical contacts 220, 224 are male electrical contacts 220, 224 which protrude from a side wall 203 of the nonconductive housing 202. The male electrical contacts 220, 224 are adapted for slidable, connective engagement with respective female contacts 240, 244 of a dual outlet cover 230 described hereinbelow.

The dual outlet cover 230 comprises a plate body 231 having a front surface 232 opposing a bottom surface 233, an upper sidewall 234, a lower sidewall 235, a left sidewall 236, a right sidewall 237. The dual outlet cover 230 includes an aperture 239 defined centrally therethrough and positioned to align with the dual outlet cover attachment aperture 218 of nonconductive housing 202, to allow a respective mounting screw 270 to be inserted through aperture 239 and aperture 218, respectively, for attaching dual outlet cover 230 to nonconductive housing 202 when assembling the electrical outlet assembly 200. An pair of openings 280 is provided through the dual outlet cover 230 to allow passage by the dual female receptacles 204 therethrough.

The front surface 232 of the dual outlet cover 230 may be provided with any type of ornamentation or indicia 160, such as a company or corporate name, logo, wording, picture, photograph, or any other decorative, informational, promotional or advertisement indicia.

Dual outlet cover 230 can be constructed of a resilient plastic, plastic polymer, thermoplastic, castable plastic or plastic capable of injection molding, blow molding, extrusion, and the like.

The dual outlet cover 230 further comprises a first and second ear 300, 310 integrally protruding perpendicularly from the bottom surface 233 of dual outlet cover 230. Each ear 300, 310 is provided with a recessed cavity 312 within which the female electrical contacts 240, 244, respectively, are suitably affixed. The male electrical contacts 220, 224 of the nonconductive housing 202 are spatially arranged so as to intimately engage the female electrical contacts 240, 244, respectively when mounting the dual outlet cover 230 to nonconductive housing 202. The engagement by male electrical contacts 220, 224 with respective female electrical contacts 240, 244 form a frictional, interference fit, thereby ensuring fixed, hot electrical connection between male electrical contacts 220, 224 and respective female electrical contacts 240, 244. The ears 300, 310 are sufficiently resilient to flexibly engage the corresponding male electrical contacts 220, 224, respectively when the ears 300, 310 are forced slightly aside by forcibly engaging slidably the male electrical contacts 220, 224 with the female electrical contacts 240, 244, respectively.

The female electrical contacts 240, 244 have electrical wires 296 running therefrom, the electrical wires 296 having ends 297 electrically connected to a function indicator 120 which provides specific functional actions. Thus, as the male electrical contacts 220, 224 mate with the female electrical contacts 240, 244, respectively, electrical power travels through electrical wires 296 to function indicator 120 to operate function indicator 120. The function indicator 120 is suitably affixed within a recessed cavity 330 formed within an upper portion of the dual outlet cover 230. A hole 332 is provided in the recessed cavity 330 to allow connection by ends of electrical wires 296 to the function indicator 120.

Figure 17:
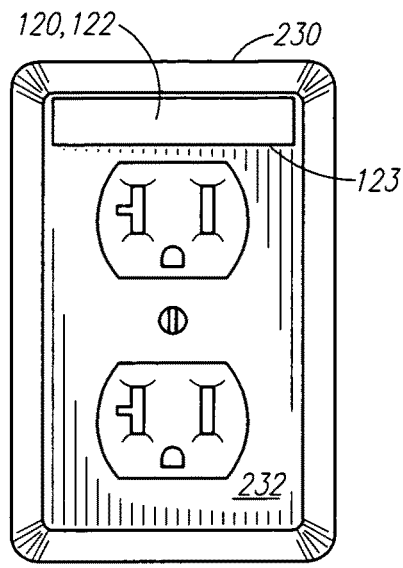
FIG. 17 is a top plan view of the receptacle cover mounted atop the electrically nonconductive housing, the cover shown incorporating a function indicator, in accordance with the present invention.

Referring now to FIGS. 15-17, a functional indicator 120, shown herein as an LED nightlight 122, is suitably affixed within the recessed cavity 330 formed within the upper portion of the dual outlet cover 230. The recessed cavity 330 is sizably shaped and configured to snugly receive the LED nightlight 122. The LED nightlight 122 is enclosed by a protective, transparent cover 123. Once mounted within the recessed cavity 330, the upper surface of the protective, transparent cover 123 is aligned contiguously with the front surface 232 of dual outlet cover 230. Hole 332 in recessed cavity 330 allows connection by ends of electrical wires 296 to LED nightlight 122.

Figure 18:
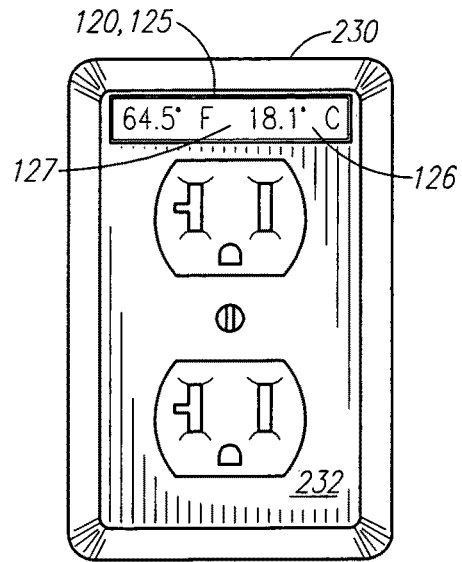
FIG. 18 is a top plan view of the receptacle cover mounted atop the electrically nonconductive housing incorporating a first alternative function indicator, in accordance with the present invention.
Figure 19:
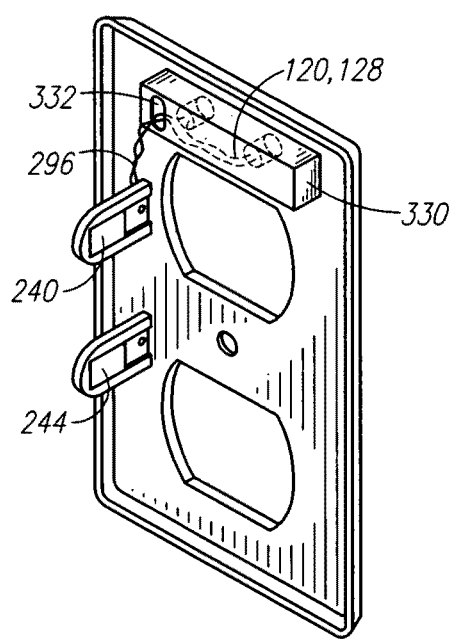
FIG. 19 is a rear perspective view of the receptacle cover incorporating a second alternative function indicator, in accordance with the present invention.
Figure 20:
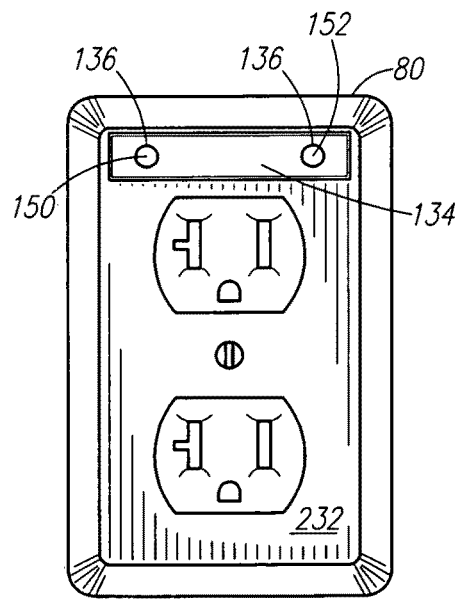
FIG. 20 a top plan view of the receptacle cover of FIG. 19, shown mounted atop the electrically nonconductive housing, in accordance with the present invention.

Referring now more specifically to FIGS. 15-16, and 18, an LCD temperature gauge 125 is shown suitably affixed within the recessed cavity 330 of dual outlet cover 230. The recessed cavity 330 is sizably shaped and configured to snugly receive the LCD temperature gauge 125. The LCD temperature gauge 125 is enclosed by a protective, transparent cover 126. Once mounted within the recessed cavity 330, the upper surface of the protective, transparent cover 126 is aligned contiguously with the front surface 232 of dual outlet cover 230. Hole 332 in recessed cavity 330 allows connection by ends of electrical wires 296 to LCD temperature gauge 125. Temperature is numerically displayed in both degrees Fahrenheit F. and degrees Celsius C. The LCD temperature gauge 125 has an accuracy of approximately +/−0.1 degrees F. or C. The LCD temperature gauge 125 may comprise a colored LED backlighting 327, such as red or green.

Referring now to FIGS. 15-16, and 19-20, a peak demand status indicator 128 is disclosed for indicating either a peak energy consumption time or a non-peak energy consumption time. The peak demand status indicator 128 is suitably disposed within the recessed cavity 330 of the dual outlet cover 230. A door 334 is provided to enclose the indicator 128 within the recessed cavity 330. The door 334 is removably mounted to the front surface 232 of dual outlet cover 230 via a snap fit connection. The door 334 is provided with a pair of LED receiving holes 336 through which a pair of LEDs 350, 352 are positioned.

The peak demand status indicator 128 is configured and otherwise operates in the same manner as described hereinabove. Therefore, for purposes of brevity, the peak demand status indicator's 128 circuitry will not be further described.

It is envisioned that the various embodiments, as separately disclosed, are interchangeable in various aspects, so that elements of one embodiment may be incorporated into one or more of the other embodiments, and that specific positioning of individual elements may necessitate other arrangements not specifically disclosed to accommodate performance requirements or spatial considerations.

It is to be understood that the embodiments and claims are not limited in its application to the details of construction and arrangement of the components set forth in the description and illustrated in the drawings. Rather, the description and the drawings provide examples of the embodiments envisioned, but the claims are limited to the specific embodiments. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be broadly limited only by the following Claims.

What is claimed is:

1. An electric function module assembly, the assembly comprising:
    an electric switch box, the electric switch box comprising:
    a mechanical movement means for actuation of the electric switch box, the assembly is permanently affixed to an electrical junction box providing electric power wiring, the electrical power wiring has exposed ends attached to the electric switch box;
    a first male electrical contact and a second male electrical contact, the first and second male electrical contacts protrude from a sidewall of the electric switch box, the first and second male electrical contacts have an electrical load wired in series therewith, wherein the electrical load is turned on by actuation of the mechanical movement means;
    a third electrical contact to which a ground wire is connected;
    outer flanges positioned at a top and a bottom end of the electric switch box, the outer flanges are each provided with a plurality of apertures for receipt of mounting screws which attach the electric switch box to the electrical junction box;
    an upper switch cover attachment aperture and a lower switch cover attachment aperture, the upper switch cover attachment aperture is disposed below the top outer flange of the electric switch box, the lower switch cover attachment aperture is disposed above the bottom outer flange of the electric switch box; and
    a switch cover for attachment to the electric switch box, the switch cover comprises:
        a plate body having a front surface opposing a bottom surface, an upper sidewall, a lower sidewall, a left sidewall, a right sidewall;
        a pair of apertures defined through the plate body and positioned to align with the upper switch cover attachment aperture and the lower switch cover attachment aperture of the electric switch box to allow a respective mounting screw to be inserted through the pair of apertures of plate body apertures and the upper switch cover attachment aperture and the lower switch cover attachment aperture of the electric switch box, respectively, for attaching the switch cover to the electric switch box;
        an opening provided through the plate body to allow the mechanical movement means to pass therethrough;
        a function indicator;
        a first ear and a second ear integrally protruding perpendicularly from the bottom surface of the switch cover, wherein the first ear and the second ear are each provided with a recessed cavity;
        a first female electrical contact and a second female electrical contact suitably affixed within the recessed cavity of the first ear and the second ear, respectively, and wherein the first and second male electrical contacts of the electric switch box are spatially arranged so as to intimately engage the first and second female electrical contacts, respectively, when mounting the switch cover to the electric switch box, and wherein the first and second male electrical contacts slidably engage the first and second female electrical contacts, respectively, forming a frictional, interference fit, thereby ensuring a fixed, hot electrical connection between the first and second male electrical contacts and the first and second female electrical contacts, respectively; and
        a recessed compartment formed within an upper portion of the switch cover, the function indicator is suitably affixed within the recessed compartment, the recessed compartment includes a hole defined therein.

2. The assembly of claim 1, wherein the first and second female electrical contacts have electrical wires running therefrom, the electrical wires having ends extending through the hole of the recessed compartment and are electrically connected to the function indicator, thus, as the first and second male electrical contacts mate with the first and second female electrical contacts, respectively, an electrical power travels through the electrical wires to the function indicator to operate the function indicator.

3. The assembly of claim 1, wherein the first ear and the second ear are sufficiently resilient to flexibly engage the first and second male electrical contacts, respectively, when the first ear and the second ear are forced slightly aside by forcibly engaging slidably the first and second male electrical contacts with the first and second female electrical contacts, respectively.

4. The assembly of claim 1, wherein the front surface of the plate body of the switch cover is provided with ornamentation or indicia.

5. The assembly of claim 2, wherein the function indicator is an LED nightlight.

6. The assembly of claim 5, wherein the wherein the LED nightlight is suitably affixed within the recessed compartment of the switch cover, the recessed compartment is sizably shaped and configured to snugly receive the LED nightlight, the LED nightlight is enclosed by a protective, transparent cover, and wherein the LED nightlight is affixed within the recessed compartment in a manner such that an upper surface of the protective, transparent cover is aligned contiguously with the front surface of the switch cover.

7. The assembly of claim 2, wherein the function indicator is an LCD temperature gauge.

8. The assembly of claim 7, wherein the LCD temperature gauge is suitably affixed within the recessed compartment of the switch cover, the recessed compartment is sizably shaped and configured to snugly receive the LCD temperature gauge, the LCD temperature gauge is enclosed by a protective, transparent cover, and wherein the LCD temperature gauge is affixed within the recessed compartment in a manner such that an upper surface of the protective, transparent cover is aligned contiguously with the front surface of the switch cover.

9. The assembly of claim 2, wherein the function indicator is a peak demand status indicator for indicating either a peak energy consumption time or a non-peak energy consumption time.

10. The assembly of claim 9, wherein the peak demand status indicator is suitably disposed within the recessed compartment of the switch cover, the recessed compartment includes a door removably mounted to the front surface of the switch cover via a snap fit connection to enclose the peak demand status indicator within the recessed compartment, the door is provided with a pair of LED receiving holes through which a pair of LEDs are positioned.

11. The assembly of claim 10, wherein the peak demand status indicator comprises a timer in communication with a synchronized clock, the clock is synchronized with a current official time, the synchronized clock is connected to the ends of the electrical wires of the female electrical contacts, the timer activates a code generation signal when the timer receives an energy consumption time value signal, the code generation signal is received and read by a code encoder, the code encoder creates one of two serial binary codes indicating either a peak energy consumption time or a non-peak energy consumption time, the binary code is transmitted to a code transceiver which then transmits an indicator signal to an LED indicator drive which enables one of two LED indicators to illuminate, a first LED indicator is illuminated when energy consumption is at a peak level, and a second LED indicator is illuminated when energy consumption is at a non-peak level.

12. The assembly of claim 11, wherein the first LED indicator is a red LED which indicates a time during which energy consumption is at a peak level, and the second LED indicator is a green LED which indicates a time during which energy consumption is at a non-peak level.

13. An electric function module assembly, the assembly comprising:
an electrical outlet assembly, the electric outlet assembly comprises:
an electrically nonconductive housing;
dual female receptacles, the dual female receptacles are supported by the nonconductive housing, the nonconductive housing has outer flanges at a top and bottom end thereof, the flanges are each provided with a plurality of apertures for receipt of mounting screws which attach the housing to an electrical junction box providing electric power wiring, the electrical power wiring has exposed ends connected to the dual female receptacles, the dual female receptacles having an electrical load wired in series therewith, the nonconductive housing includes an electrical ground contact to which a ground wire is connected, the nonconductive housing includes a dual outlet cover attachment aperture disposed between the dual female receptacles, and wherein the nonconductive housing further comprises a first male electrical contact and second male electrical contact, the first and second male electrical contacts protrude from a side wall of the nonconductive housing, the first and second male electrical contacts have an electrical load wired in series therewith; and
a dual outlet cover for attachment to the nonconductive housing, the dual outlet cover comprises:
a plate body having a front surface opposing a bottom surface, an upper sidewall, a lower sidewall, a left sidewall, a right sidewall;
an aperture defined centrally therethrough and positioned to align with the dual outlet cover attachment aperture of the nonconductive housing to allow a respective mounting screw to be inserted through the aperture of the plate body and the dual outlet cover attachment aperture, respectively, for attaching the dual outlet cover to the nonconductive housing;
a pair of openings provided through the dual outlet cover to allow passage by the dual female receptacles therethrough;
a function indicator;
a first ear and a second ear integrally protruding perpendicularly from the bottom surface of the dual outlet cover, wherein the first ear and the second ear are each provided with a recessed cavity;
a first female electrical contact and a second female electrical contact are suitably affixed within the recessed cavity of the first ear and the second ear, respectively, the first and second male electrical contacts of the nonconductive housing are spatially arranged so as to intimately engage the first and second female electrical contacts, respectively, when mounting the dual outlet cover to the nonconductive housing, and wherein the first and second male electrical contacts slidably engage the first and second female electrical contacts, respectively, forming a frictional, interference fit, thereby ensuring a fixed, hot electrical connection between the first and second male electrical contacts and the first and second female electrical contacts, respectively; and
a recessed compartment formed within an upper portion of the dual outlet cover, the function indicator is suitably affixed within the recessed compartment, the recessed compartment includes a hole defined therein.

14. The assembly of claim 13, wherein the first and second female electrical contacts have electrical wires running therefrom, the electrical wires having ends extending through the hole of the recessed compartment and are electrically connected to the function indicator, thus, as the first and second male electrical contacts mate with the first and second female electrical contacts, respectively, an electrical power travels through the electrical wires to the function indicator to operate the function indicator.

15. The assembly of claim 13, wherein the first ear and the second ear are sufficiently resilient to flexibly engage the first and second male electrical contacts, respectively, when the first ear and the second ear are forced slightly aside by forcibly engaging slidably the first and second male electrical contacts with the first and second female electrical contacts, respectively.

16. The assembly of claim 14, wherein the function indicator is selected from the group consisting of an LED nightlight, an LCD temperature gauge, and a peak demand status indicator for indicating either a peak energy consumption time or a non-peak energy consumption time.

17. The assembly of claim 13, wherein the front surface of the plate body of the dual outlet cover is provided with ornamentation or indicia.

* * * * *